United States Patent Office 2,810,714
Patented Oct. 22, 1957

2,810,714

METHOD OF RECOVERING UNREACTED MONOMERS INCLUDING A VINYLPYRIDINE

John A. Price, Stamford, Conn., assignor to American Cyanamid Company, New York, N. Y., a corporation of Maine No Drawing. Application November 8, 1955, Serial No. 545,802

13 Claims. (Cl. 260—80.5)

This invention relates to a new and improved method of separating or recovering unreacted monomers. The invention is concerned more particularly with the separation or isolation of unpolymerized monomers that are present in a relatively small amount in the mass resulting from the polymerization of a mixture of a plurality of ethylenically unsaturated monomers, including a vinylpyridine. The main product of the polymerization reaction is a vinylpyridine copolymer.

In the copolymerization of (1) a vinylpyridine, e. g., 2-methyl-5-vinylpyridine, with (2) one or more other ethylenically unsaturated monomers (more particularly such monomers containing a $CH_2=C<$ grouping, e. g., acrylonitrile, methyl acrylate, styrene, vinyl acetate, acrolein, acrylic acid, etc.), a copolymer is obtained together with some unreacted monomers. The effective separation of the vinylpyridine monomer from the other components of the mass heretofore has been a serious problem, for instance, in making copolymers of copolymerizable ingredients including acrylonitrile and a vinylpyridine. One reason for this is because the monomeric vinylpyridine becomes adsorbed, or tends to become adsorbed, on the particles of copolymer thereby hindering the effective separation of the monomer. Furthermore, the monomer or monomers of (2), supra, are likely to become contaminated with the vinylpyridine monomer when attempts are made to separate the unreacted monomers from the copolymer by, for example, distillation or extraction. It has also been noted that distillation of vinylpyridines by distillation from dilute aqueous solutions is somewhat difficult due to the large amount of water accompanying the vinylpyridine distillate. In certain other cases, the unreacted vinylpyridine and the other ethylenically unsaturated monomer or monomers have such close boiling points that "clean" separation of these monomers by distillation can be accomplished only by using relatively expensive fractionating equipment.

It is a primary object of the present invention to provide a new, improved and relatively inexpensive method whereby unreacted monomers, including essentially, a vinylpyridine, can be separated from a mass containing such monomers and, also, a copolymer of (1) a vinylpyridine and (2) volatile, ethylenically unsaturated monomeric material (that is, one or more monomers) which is different from the said vinylpyridine and is copolymerizable therewith, more particularly such monomeric material wherein the individual monomer or monomers that are present therein contain one or more $CH_2=C<$ groupings.

It is a further object of the present invention to provide a method of the general character described briefly in the preceding paragraph which can be practiced without the use of expensive, complicated equipment.

Other objects of the invention will be apparent to those skilled in the art from the following more detailed description.

The foregoing objects are attained, and the difficulties briefly described hereinbefore in the separation of unreacted vinylpyridine monomer from other components of a mass containing such a monomer and other monomers copolymerizable with a vinylpyridine, and containing also a copolymer of the vinylpyridine, are obviated or minimized by practicing the present invention.

Briefly described, the invention involves a method which comprises removing unreacted, volatile, ethylenically unsaturated monomeric material which is different from a vinylpyridine and is copolymerizable therewith from a mass containing this monomer, as well as other monomeric material, and a vinylpyridine copolymer by distillation (preferably under reduced pressure) while the unreacted vinylpyridine present in the aforesaid mass is in the form of an acid-addition salt thereof, preferably an inorganic acid-addition salt (e. g., the nitrate, sulfate, phosphate, phosphite, chloride or other halide, etc.) of the said vinylpyridine. The vinylpyridine copolymer is then separated from the residue, for instance, by filtration, centrifuging or any other suitable means. The unreacted vinylpyridine in salt form that is present in the copolymer-free mass is then converted to free-base form. Thereafter, the unreacted vinylpyridine in free-base form is separated from the copolymer-free mass, e. g., by contacting the said mass with an adsorbent for the said vinylpyridine. This adsorbent is preferably activated carbon in granular or finely-divided form. Examples of other adsorbents that may be employed with somewhat less effectiveness are fuller's earth, activated bleaching clays (especially acid-activated bleaching clays) and various synthetic inorganic adsorbents. Alternatively, the unreacted vinylpyridine in free-base form may be separated from the copolymer-free mass by extraction with a suitable solvent for the vinylpyridine, e. g., aromatic solvents such, for instance, as benzene, toluene, xylene, etc., chlorinated hydrocarbons, e. g., carbon tetrachloride, ethylene dichloride, etc.

By putting the unreacted vinylpyridine monomer in the form of its acid-addition salt, if it is not already in that form, the vinylpyridine is rendered substantially non-distillable during distillation to separate the other unreacted monomeric material. By separation of the copolymer from the residue remaining after distillation of the other monomers, preferably by filtration followed by washing (e. g., with water), the complicating effect of the presence of the copolymer solids is thereby avoided. Furthermore, the acid-addition salt form of the vinylpyridine is more easily washed out of the copolymer than when the vinylpyridine is in its neutral form. The dilute filtrate is then made alkaline by the addition of sodium or potassium hydroxide or carbonate, ammonium hydroxide, calcium hydroxide, or other inorganic acid-neutralizing material, in order to convert the vinylpyridine to its more easily recoverable free-base form. The vinylpyridine can then be easily separated or isolated by contacting the solution with a suitable adsorbent. For instance, the solution may be percolated through a bed of a granular adsorbent such as granular activated carbon; or it may be admixed with a finely-divided adsorbent, e. g., activated carbon, and the carbon then removed by passing the mixture through a suitable filter press.

In order that those skilled in the art may better understand how the present invention can be carried into effect, the following examples are given by way of illustration and not by way of limitation. All parts and percentages are by weight unless otherwise stated.

Example 1

A ternary polymer of acrylonitrile is prepared under acidic (nitric acid) conditions by a continuous method from a mixture of monomers comprising 85% of acrylonitrile, 7.5% of a vinylpyridine, specifically 2-methyl-5-vinylpyridine, and 7.5% of a vinyl ester, specifically vinyl acetate. The conversion of monomer to polymer is about 82%. A slurry sample of this polymer as it is received from the continuous polymerization unit is found to contain 23.3% polymer solids and has a pH of about 2.0. A dodecyl mercaptan titration of the slurry further indicates that it contains 2.70% of total monomeric acrylonitrile and vinyl acetate.

A 1360 g. sample of the slurry is charged to a 2-liter reaction vessel equipped with a stirrer, thermometer, a 12-inch column packed with Beryl saddles and a condenser arranged for distillation. The receiving flask is immersed in an ice bath and a Dry-Ice trap is placed between the receiving flask and the vacuum pump. The distilling flask is heated by means of an oil bath.

The slurry is heated to 38°–42° C. and the pressure reduced from 125 to 50 mm. over a 15-minute period. The acrylonitrile and vinyl acetate that are collected in the ice and Dry-Ice receivers during this vacuum stripping amount to 40.5 g. This amount corresponds to an acrylonitrile-vinyl acetate concentration in the polymer slurry before stripping of 2.98%. By analysis, the recovered mixed monomer is found to contain 18.3% vinyl acetate.

The stripped slurry (that is, the residue of the above-described distillation) is filtered on a Büchner funnel and washed with about 800 ml. of demineralized water. The filtrate is made alkaline by the addition of 200 ml. of 5% sodium hydroxide. The total volume of the filtrate is 1800 ml., and titration indicates a concentration of 0.5% of 2-methyl-5-vinylpyridine.

A 20-inch column equipped with a sintered glass disc on the bottom is packed with 15 inches (82.5 g.) of granular (specifically 8–14 mesh) activated carbon. Two hundred milliliters of water is passed through the column followed by the above-described alkaline filtrate. One hundred milliliter samples of the filtrate are collected and titrated for methylvinylpyridine content. The carbon contains a small amount of alkali for which a correction is made in subsequent calculations. No titratable methylvinylpyridine is found in the first sixteen 100-ml. samples of filtrate. The methylvinylpyridine concentration in the seventeenth sample is about 0.01% and in the eighteenth sample about 0.10%. These results indicate that eight grams of methylvinylpyridine are adsorbed before the breakthrough point is reached.

The moist column is then treated with 250 ml. of 0.5 N hydrochloric acid followed by 400 ml. of water. The filtrate is collected in 100-ml. samples and titrated with 0.50 N sodium hydroxide for methylvinylpyridine content. Titration results indicate that a total of 4.3 g. of methylvinyl pyridine has been recovered in the filtrate.

*Example 2*

The same procedure in the preparation of the polymer slurry is followed as described under Example 1. Likewise, the method of vacuum stripping (that is, distilling under sub-atmospheric pressure) the mixture of acrylonitrile and vinyl acetate monomers is essentially the same as in Example 1 with the exception that the stripping is carried out at a temperature of 40°–45° C. and under a pressure of 50–70 mm. The weight of recovered acrylonitrile-vinyl acetate mixture of monomers amounts to 42.8 g. This value corresponds to an acrylonitrile-vinyl acetate concentration in the polymer slurry before stripping of 2.85%. A dodecyl mercaptan titration of the stripped slurry indicates an acrylonitrile-vinyl acetate concentration of 0.08% based on the original weight of the slurry. Hence, only 2.8% of the recoverable acrylonitrile-vinyl acetate remains in the stripped slurry.

The subsequent procedure is the same as in Example 1. Similar results are obtained.

*Example 3*

The same procedure is followed as in Example 2 except that the 2-methyl-5-vinylpyridine is replaced with an equal weight of 2-vinylpyridine. The recovery of acrylonitrile and vinyl acetate is nearly quantitative and about 7.5 g. of 2-vinylpyridine is adsorbed in the column of activated carbon.

*Example 4*

This procedure is similar to Example 2 except that the 2-methyl-5-vinylpyridine is replaced with an equal weight of 2-vinyl-5-ethylpyridine and the vinyl acetate is replaced with an equal weight of methyl acrylate. Again, a nearly quantitative recovery of acrylonitrile and methyl acrylate is obtained and eight grams of 2-vinyl-5-ethylpyridine is adsorbed on the column of activated carbon.

*Example 5*

By the same method employed in Example 1, a copolymer is prepared from a mixture of about 90% methyl acrylate and 10% 2-vinylpyridine. The pH of the resultant slurry is about 3. After recovering the unreacted monomeric methyl acrylate by distillation in almost quantitative yield, the copolymer is filtered off and washed. The filtrate is made alkaline with aqueous KOH and the 2-vinylpyridine is adsorbed on granular activated carbon by percolating it through a bed or column of said carbon as described in the preceding examples. It can be extracted from the adsorbent, if desired, by treatment with a solvent for the 2-vinylpyridine.

*Example 6*

A copolymer of about 90% vinyl acetate and 10% 2-vinylpyridine is prepared in a manner similar to that described under Example 1, except that emulsion- instead of solution-polymerization technique is employed. This necessitates the addition of an emulsifying agent, e. g., sodium lauryl sulfate, to the reaction mass. After the polymerization reaction has been completed, the emulsion is broken by the addition of sodium sulfate. The unreacted vinyl acetate and 2-vinylpyridine are recovered in the same manner described under Example 5.

Instead of adsorbing the monomeric 2-vinylpyridine on activated carbon, one can separate it from the aqueous alkaline filtrate by extraction with a solvent for the 2-vinylpyridine, e. g., benzene.

*Example 7*

A copolymer of 80% styrene and 20% 2-methyl-5-vinylpyridine is prepared in an aqueous emulsion, using azodiisobutyronitrile as the polymerization initiator. At the end of the polymerization period, the emulsion is broken by the addition of sodium sulfate. The pH of the slurry is lowered to 3 by the addition of sulfuric acid and the styrene is recovered by distillation under reduced pressure. After filtering and washing, the pH of the resulting filtrate is raised to 10 by the addition of sodium hydroxide.

The unreacted 2-methyl-5-vinylpyridine is again effectively adsorbed by percolating the aqueous alkaline filtrate through a column of granular activated carbon. Alternatively, finely-divided activated carbon (e. g., 1–10% by weight of the filtrate) may be admixed with the aqueous filtrate and either allowed to stand undisturbed for 12–24 hours at 20°–80° C., or mechanically agitated with the aqueous filtrate at 20°–80° C. for a shorter period of time, e. g., ½ to 6 hours.

It will be understood, of course, by those skilled in the art that my invention is not limited to the specific conditions nor to the preparation of the particular copolymers given by way of illustration in the foregoing examples. Thus, instead of preparing a copolymer of 2-vinylpyridine or of 2-methyl-5-vinylpyridine as is set forth in certain of the examples, I may prepare a copolymer of any other vinylpyridine. In other words, copolymers can be prepared (and unreacted monomers recovered in accordance with the invention) using vinylpyridines represented by the formula I 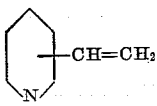

and which include 2-vinylpyridine, 3-vinylpyridine and 4-vinylpyridine; methyl vinylpyridines represented by the formula II 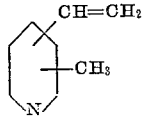

and which include 2-methyl-3-vinylpyridine, 3-vinyl-4-methylpyridine, 3 - vinyl - 5 - methylpyridine, 2 - vinyl-3-methylpyridine, 2 - vinyl - 4 - methylpyridine, 2 - vinyl-5-methylpyridine, 2 - vinyl - 6 - methylpyridine, 2-methyl-4-vinylpyridine, 2-methyl-5-vinylpyridine and 3-methyl-4-vinylpyridine. The vinylpyridines embraced by Formula II are a preferred sub-group within a broader class of vinylpyridines that are advantageously employed in making copolymers with, for instance, acrylonitrile and which may be represented by the formula III 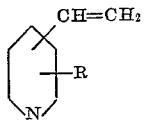

and wherein R represents a lower alkyl radical, more particularly a methyl, ethyl, propyl (including n-propyl and isopropyl) or butyl (including n-butyl, isobutyl, sec.-butyl and tert.-butyl) radical. Other examples include 2-vinyl-4,6-dimethylpyridine, the 2- and 4-vinylquinolines, 2-vinyl-4,6-diethylpyridine and others embraced by the formula IV 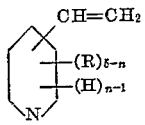

wherein R represents a lower alkyl radical, examples of which have been given hereinbefore, and $n$ represents an integer from 1 to 5, inclusive.

Illustrative examples of substances that can be copolymerized with a vinylpyridine (and the unreacted monomers recovered as hereinbefore described) are vinyl compounds that are different from the vinylpyridine, including the vinyl and isopropenyl aromatic compounds, more particularly the vinyl and isopropenyl aromatic hydrocarbons (e. g., styrene, isopropenyl toluene, the various dialkyl styrenes, etc.), other aliphatic compounds containing a $CH_2=C<$ grouping, e. g., acrylonitrile and the various substituted acrylonitriles (e. g., methacrylonitrile, ethacrylonitrile, etc., vinyl esters, e. g., vinyl acetate, vinyl propionate, vinyl butyrate, vinyl isobutyrate, vinyl valerate, vinyl acrylate, vinyl methacrylate, etc., esters of an acrylic acid, more particularly the alkyl esters of an acrylic acid, e. g., the ethyl, propyl, isopropyl, n-butyl, isobutyl, sec.-butyl, tert.-butyl, amyl, hexyl, heptyl, octyl, etc., esters of acrylic, methacrylic, ethacrylic, phenylacrylic, etc., acids including the alkyl acrylates containing not more than four carbon atoms in the alkyl grouping, examples of which are given above, as well as other vinyl aromatic and vinyl aliphatic compounds, and other compounds containing a $CH_2=C<$ grouping, more particularly a single $CH_2=C<$ grouping.

The proportions of the vinylpyridine and volatile ethylenically unsaturated monomer which is different therefrom and copolymerizable therewith may be widely varied depending, for instance, upon the particular starting materials employed and the particular properties desired in the copolymer. Mainly for economical reasons, it is usually desirable that the vinylpyridine does not exceed about 50% by weight of the total monomers. For example, in making the copolymer I may use advantageously from about 2% to about 40% of the vinylpyridine and from about 60% to about 98% of the other copolymerizable substance or substances, e. g., a different vinyl compound or compounds, and more specifically, for example, acrylonitrile, or acrylonitrile and/or vinyl acetate.

In practicing the method of this invention, the vinylpyridine may be in the form of any acid-addition salt thereof. It may be in the form of an organic acid-addition salt, e. g., the acetate (including substituted acetates such as, for instance, the mono-, di- and trichloroacetates), propionate, oxalate, maleate, etc., or an inorganic acid-addition salt, e. g., a sulfite, nitrite, chlorate, etc., including those inorganic acid-addition salts mentioned hereinbefore.

I claim:

1. The method of separating unreacted monomers from a mass containing (a) a plurality of unreacted monomers including a vinylpyridine and (b) a copolymer of (1) a vinylpyridine and (2) volatile, ethylenically unsaturated monomeric material which is different from the said vinylpyridine, contains a $CH_2=C<$ grouping and is copolymerizable therewith, said method comprising removing the unreacted, volatile, monomeric material described under (2) from the said mass by distillation while the unreacted vinylpyridine present in the said mass is in the form of an acid-addition salt thereof; separating the vinylpyridine copolymer from the residue; converting the aforesaid unreacted vinylpyridine in salt form that is present in the copolymer-free mass to free-base form; and separating the unreacted vinylpyridine in free-base form from said copolymer-free mass.

2. A method as in claim 1 wherein the unreacted, volatile monomeric material described under (2) is removed by distillation under sub-atmospheric pressure.

3. A method as in claim 1 wherein the vinylpyridine of (1) is 2-methyl-5-vinylpyridine.

4. A method as in claim 1 wherein the volatile, monomeric material of (2) includes acrylonitrile.

5. A method as in claim 1 wherein the volatile, monomeric material of (2) includes both acrylonitrile and vinyl acetate.

6. A method as in claim 1 wherein the volatile, monomeric material of (2) includes both acrylonitrile and methyl acrylate.

7. A method as in claim 1 wherein the unreacted vinylpyridine in free-base form is separated from the copolymer-free mass by contacting the said mass with an adsorbent for the said vinylpyridine.

8. A method as in claim 7 wherein the adsorbent is activated carbon.

9. A method as in claim 1 wherein the unreacted vinylpyridine in free-base form is separated from the copolymer-free mass by percolating the said mass through a bed of granular activated carbon.

10. The method of separating unreacted monomers including acrylonitrile and 2-methyl-5-vinylpyridine from a mass containing said monomers and a copolymer of ingredients including acrylonitrile and 2-methyl-5-vinylpyridine, said method comprising removing the unreacted volatile monomers including acrylonitrile from the said mass by distillation under sub-atmospheric pressure while the unreacted 2-methyl-5-vinylpyridine present in the said mass is in the form of an inorganic acid-addition salt thereof; filtering the said copolymer from the residue; converting the aforesaid unreacted 2-methyl-5-vinylpyridine in salt form that is present in the filtrate to free-base form; and separating the unreacted 2-methyl-5-vinylpyridine in free-base form from said filtrate by percolating it through a bed of granular activated carbon.

11. A method as in claim 10 which includes the additional step of extracting the adsorbed 2-methyl-5-vinyl-pyridine from the said activated carbon by contacting the latter with a solvent for the said 2-methyl-5-vinylpyridine.

12. A method as in claim 10 wherein the unreacted monomers include acrylonitrile, vinyl acetate and 2-methyl-5-vinylpyridine.

13. A method as in claim 10 wherein the unreacted monomers include acrylonitrile, methyl acrylate and 2-methyl-5-vinylpyridine.

References Cited in the file of this patent

UNITED STATES PATENTS 2,491,472   Harmon _____ Dec. 20, 1949